United States Patent
Gao et al.

(10) Patent No.: US 11,248,709 B2
(45) Date of Patent: Feb. 15, 2022

(54) FAST BLIND PLATE SWITCHING DEVICE

(71) Applicants: BEIJING AEROSPACE PROPULSION INSTITUTE, Beijing (CN); BEIJING AEROSPACE PETROCHEMICAL TECHNOLOGY & EQUIPMENT ENGINEERING CORPORATION LIMITED, Beijing (CN)

(72) Inventors: Yang Gao, Beijing (CN); Shuai Wu, Beijing (CN); Lei Liu, Beijing (CN); Limin Dai, Beijing (CN); Xuebin Wang, Beijing (CN); Xiangyu Chen, Beijing (CN); Shuai Li, Beijing (CN)

(73) Assignees: BEIJING AEROSPACE PROPULSION INSTITUTE, Beijing (CN); BEIJING AEROSPACE PETROCHEMICAL TECHNOLOGY & EQUIPMENT ENGINEERING CORPORATION LIMITED, Beijing (CN)

(*) Notice: Subject to any disclaimer, the term of this patent is extended or adjusted under 35 U.S.C. 154(b) by 0 days.

(21) Appl. No.: 17/258,490

(22) PCT Filed: Jan. 28, 2019

(86) PCT No.: PCT/CN2019/073316
§ 371 (c)(1),
(2) Date: Jan. 7, 2021

(87) PCT Pub. No.: WO2020/073569
PCT Pub. Date: Apr. 16, 2020

(65) Prior Publication Data
US 2021/0131570 A1 May 6, 2021

(30) Foreign Application Priority Data
Oct. 11, 2018 (CN) .......................... 201811182579.2

(51) Int. Cl.
*F16K 3/312* (2006.01)
*F16K 3/02* (2006.01)
(Continued)

(52) U.S. Cl.
CPC .............. *F16K 3/0254* (2013.01); *F16K 3/20* (2013.01); *F16K 3/30* (2013.01); *F16K 3/312* (2013.01);
(Continued)

(58) Field of Classification Search
CPC . F16K 3/0254; F16K 3/20; F16K 3/30; F16K 3/312; F16K 27/044; F16K 31/50; F16K 31/508
(Continued)

(56) References Cited

U.S. PATENT DOCUMENTS 2,558,247 A * 6/1951 Hamer .................... F16K 3/312
138/94.3
2,664,918 A * 1/1954 Hamer .................... F16K 3/312
138/94.3
(Continued)

FOREIGN PATENT DOCUMENTS

| CN | 103821931 | 5/2014 |
|----|-----------|--------|
| CN | 203656173 | 6/2014 |

(Continued)

OTHER PUBLICATIONS

International Search Report for PCT/CN2019073316 dated Jul. 11, 2019, 12 pages.

*Primary Examiner* — John Bastianelli
(74) *Attorney, Agent, or Firm* — Dority & Manning, P.A.

(57) ABSTRACT

A fast blind plate switching device, comprising a sealing structure, a clamping structure, a support structure and an execution mechanism. The blind plate has an open-state structure and a blind-state structure. The support structure is (Continued)

used for connecting pipelines at two sides and providing support for the whole device. The clamping structure and the sealing structure are located inside the support structure. The clamping structure is driven by the execution mechanism, and under the drive of the execution mechanism, the clamping structure presses on the blind plate (1) to eliminate a gap between two sides of the blind plate, so that a seal is formed by means of the sealing structure. When a gap is formed away from the blind plate (1), the open/blind state of the blind plate (1) is switched.

19 Claims, 2 Drawing Sheets

(51) Int. Cl.
- *F16K 3/20* (2006.01)
- *F16K 31/50* (2006.01)
- *F16K 3/30* (2006.01)
- *F16K 27/04* (2006.01)

(52) U.S. Cl.
CPC ............ *F16K 27/044* (2013.01); *F16K 31/50* (2013.01); *F16K 31/508* (2013.01)

(58) Field of Classification Search
USPC ................. 251/326–329, 366–367; 138/94.3
See application file for complete search history.

(56) References Cited

U.S. PATENT DOCUMENTS

| | | | | |
|---|---|---|---|---|
| 2,815,771 A | * | 12/1957 | Gibbs | .................... F16K 3/312 138/94.3 |
| 2,889,853 A | * | 6/1959 | Dryer | ...................... F16K 3/312 138/94.3 |
| 3,187,776 A | * | 6/1965 | Snell, Jr. | ................. F16K 3/312 138/94.3 |
| 10,047,867 B2 | * | 8/2018 | Kim | ........................ F16K 31/60 |

FOREIGN PATENT DOCUMENTS

| | | |
|---|---|---|
| CN | 206347104 | 7/2017 |
| CN | 108119725 | 6/2018 |
| CN | 109185484 | 1/2019 |
| GB | 867577 | 5/1961 |
| JP | 2006177409 | 7/2006 |
| KR | 20140122462 | 10/2014 |

\* cited by examiner

FAST BLIND PLATE SWITCHING DEVICE

This application is a National Phase entry of PCT Application No. PCT/CN2019/073316, filed on Jan. 28, 2019, which claims the priority to Chinese Patent Application No. 201811182579.2, titled "FAST BLIND PLATE SWITCHING DEVICE", filed with the China National Intellectual Property Administration on Oct. 11, 2018, the entire disclosures of which are incorporated herein by reference.

FIELD

The present application relates to the technical field of pipeline engineering, and in particular to a fast blind plate switching device.

BACKGROUND

In petroleum, chemical, and offshore platform industries and etc., a blind plate, as a reliable isolation means, is used for completely separating mediums and preventing from affecting the production and even causing an accident due to a loose closing of a stop valve. In the switching process of the open/blind state, the procedure is tedious, the labor time is long and the labor intensity is high. Each switching process requires loosening a bolt, prying off a pipe, pulling or inserting the blind plate, installing a wound gasket and tightening the bolt. The longer the blind plate switching time is, the longer the shutdown time will be, causing the reduction of the production time and affecting the efficiency. When the medium in the pipeline is toxic, workers may also in danger of poisoning. Therefore, the entire work is required to be completed fast, and it is the faster, the better.

The traditional technical solution is faced with the above disadvantages, thus, a fast blind plate switching device urgently needs to be developed to solve the above problems.

SUMMARY

The technical problem to be solved according to the present application is to provide a fast blind plate switching device, so as to realize a fast switching and a high-performance sealing, and to realize a fast switch of the open-state and the blind-state of the blind plate on the premise of meeting the sealing partition performance.

A following technical solution according to the present application is provided. A fast blind plate switching device is provided, which includes a sealing structure, a clamping structure, a support structure and an actuator. The blind plate has an open-state and a blind-state.

The support structure is configured to connect pipelines at two sides and provide support for the whole device. The clamping structure and the sealing structure are located inside the support structure. The clamping structure is driven by the actuator, and under the drive of the actuator, the clamping structure presses the blind plate to eliminate a gap at two sides of the blind plate, so that sealing is formed by means of the sealing structure. When the gap is formed since the clamping structure is away from the blind plate, the open-state and the blind-state of the blind plate is switched.

Preferably, the support structure includes a first connecting support frame, a second connecting support frame and a support ring. Both the first connecting support frame and the second connecting support frame are rigid structures with a central through hole, which are connected and fixed by the support ring in the axial direction. The blind plate 1 is placed between the first connecting support frame and the second connecting support frame and is limited by the support ring. The second connecting support frame is provided with an installation end face of the clamping structure and the sealing structure. A distance between the installation end face and an axis of the central through hole is smaller than a minimum distance between an outer end face of the support ring and the axis of the central through hole.

Preferably, a rolling ring is further included, which is mounted outside the support ring, and the blind plate is limited by the rolling ring.

Preferably, the rolling ring includes an outer ring with an installation groove and a steel ball bushing. Multiple steel balls are embedded inside the steel ball bushing and placed in the installation groove.

Preferably, the material of the steel ball bushing is aluminum alloy, or copper alloy, or polyacetal resin.

Preferably, the clamping structure is formed by the cooperation of a transmission nut with an internal thread and the installation end face of the second connecting support frame. The installation end face is provided with an external thread matching the internal thread. A drive plate is arranged on an outer end face of the transmission nut. A driving force of the actuator is transmitted by the drive plate.

Preferably, the drive plate is vertically welded on the outer end face of the transmission nut.

Preferably, the internal thread and the external thread form a trapezoidal thread pair with self-locking characteristics.

Preferably, the outer end face of the transmission nut is fixedly installed with a fixing plate with a bending portion, and an axial linkage between the transmission nut and a sealing seat is realized by the cooperation of the bending portion with the ring groove arranged on the sealing seat.

Preferably, the sealing structure includes the sealing seat and a sealing member.

The sealing seat is an annular sealing seat, which is installed on the installation end face of the second connecting support frame, and placed between the clamping structure and the blind plate. A sealing member is located between the sealing seat and the installation end face, the sealing seat and the blind plate, the blind plate and the first connecting support frame, respectively, for sealing.

Preferably, the sealing member is one of the following forms: a sealing gasket, a sealing ring, a wound gasket, a sealing block and a metal gasket.

Preferably, the actuator includes a hand wheel, a transmission shaft, a transmission support block and a transmission ring. The hand wheel is connected to the transmission shaft, the transmission shaft is mounted on the transmission support block and is connected to the transmission support block by a thread, the transmission ring is fixed on the transmission shaft, and the driving force is transmitted by the contact between the transmission ring and the clamping structure.

Preferably, a locking handle is further included, the transmission shaft moving in place is locked by the locking handle.

Preferably, a locking handle is included, and the transmission shaft moving in place is locked by the locking handle.

Preferably, the transmission ring is fixed to the transmission shaft through an elastic cylindrical pin, and the hand wheel is fixed to the transmission shaft by the locking nut.

Preferably, an indicator board is installed on the transmission support block, and an "on" scale and an "off" scale are preset on the indicator board to indicate the working state of the hand wheel.

Preferably, the blind plate has an open-state and a blind-state. Specifically, a part of a plate is provided with an opening, and another part of the plate is a solid plate. The opening is used for communicating pipelines and the solid plate is used for isolating the pipelines.

Preferably, a stop plate is mounted at each of two ends of the blind plate in the switching direction, at least the stop plate at one end of the blind plate is equipped with a handle, which is configured to push the blind plate to a place where the stop plate is in contact with the support structure and complete the switching of the open state and the blind state of the blind plate.

Preferably, the driving mode for operating the hand wheel or the handle includes one of the following modes: a manual mode, a pneumatic mode, a hydraulic mode and an electric mode.

Compared with the conventional technology, the present application has the following advantageous effects.

(1) The fast blind plate switching device provided according to the present application adopts a unique structural design, redesigns the sealing structure, the clamping structure, the support structure and the transmission mechanism of the blind plate, improves or removes the tedious operations such as disassembling bolts and nuts, which used to consume a lot of working hours in the work of switching the blind plate, and transforms into simple operations of rotating the hand wheel and pushing and pulling the blind plate, and can fast switch the open position and the blind position of the blind plate without other tools, which is simple and high efficient. The fast blind plate switching device can completely replace the function of a spectacle blind plate, and shorten the whole operation time to a negligible degree compared with the switching time of the spectacle blind plate, thereby improving production efficiency, reducing the leakage amount of the medium, reducing environmental pollution and improving personnel safety.

(2) The device can be used in battery limit isolation, material isolation, regular maintenance and other occasions where complete isolation is required, to achieve fast isolation or communication of the pipelines, to protect the safe operation of equipment and devices, and to meet the needs of safety and technology.

(3) The device has the advantages of good sealing, simple and quick operation, convenient maintenance, fast and labor-saving, meeting the requirements in many processes for fast and high efficient blind sealing the pipelines, and can be widely used in petroleum, chemical industry, offshore platform and other industries or devices.

(4)

| | |
|---|---|
| 1 blind plate, | 2 first connecting support frame, |
| 3 second connecting support frame, | 4 sealing seat, |
| 5 transmission nut, | 6 transmission shaft, |
| 7 first sealing member, | 8 second sealing member, |
| 9 hand wheel, | 10 indicator board, |
| 11 stop plate, | 12 transmission ring, |
| 13 handle, | 14 rolling ring, |
| 15 support ring, | 16 transmission support block, |
| 17 drive plate. | |

DETAILED DESCRIPTION OF THE EMBODIMENTS

The technical solutions according to the present application are described in detail in conjunction with drawings and specific embodiments.

The fast blind plate switching device provided by the present application adopts a unique structural design, and mainly includes four parts: a sealing structure, a clamping structure, a support structure and an actuator. The external support structure connects pipes on two sides and is a rigid structure that supports the whole device, so as to ensure that the internal clamping structure and the sealing structure are not affected by external forces such as pipe stress, and the expansion of the pipe is not required when adjusting the gap, avoid the problem that the pipe stress is too large thus the pipe is difficult to push off and avoid the problem that the sealing force is affected by the external forces such as the pipe stress, which affects the reliability of the sealing. The internal clamping structure is driven by the actuator and may move back and forth in an axial direction. The clamping structure presses the blind plate to eliminate a gap at two sides of the blind plate, so that sealing is formed, and when the clamping structure is away from the blind plate and the gap is formed, the open/blind state of the blind plate may be switched. A trapezoidal thread pair in the clamping structure has the self-locking characteristics. No matter what the pressure of the medium in the pipeline is, the trapezoidal thread pair cannot rotate and loosen, which ensures the reliability of the sealing.

Figure 1:
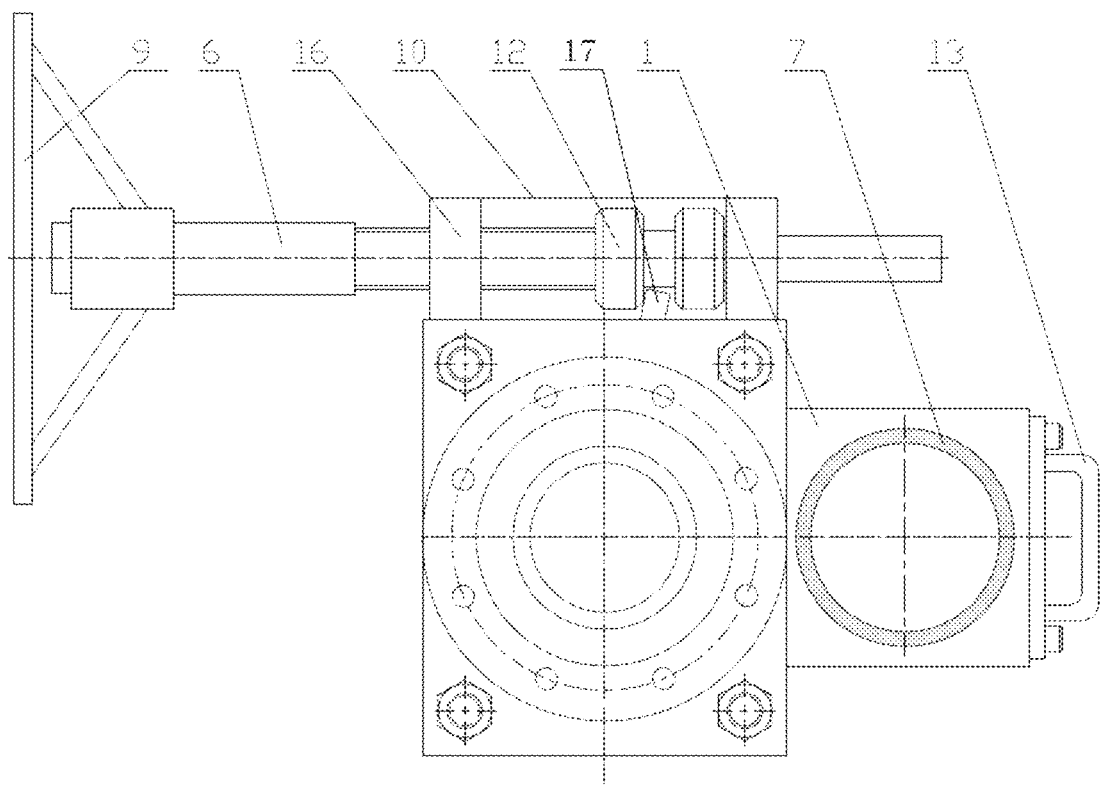
FIG. 1 is a schematic structural view of a fast blind plate switching device according to the present application.
Figure 2:
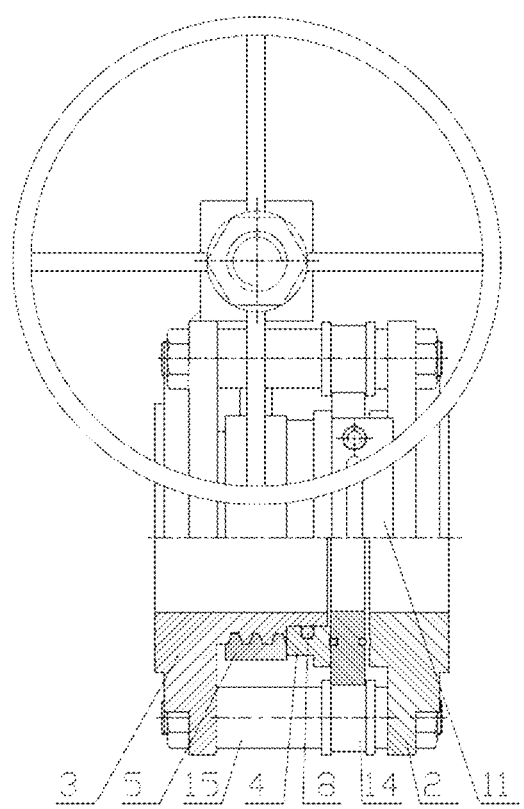
FIG. 2 is a semi-sectional view of the fast blind plate switching device according to the present application.

As shown in FIGS. 1 and 2, a fast blind plate switching device according to the present application includes a blind plate 1, a first connecting support frame 2, a second connecting support frame 3, a sealing seat 4, a transmission nut 5, a transmission shaft 6, a first sealing member 7, a second sealing member 8, a hand wheel 9, an indicator board 10, a stop plate 11, a transmission ring 12, a handle 13, a rolling ring 14, a support ring 15 and a transmission support block 16.

The support ring 15 is arranged between the first connecting support frame 2 and the second connecting support frame 3, and a stud is arranged in the support ring 15.

The first connecting support frame 2, the second connecting support frame 3 and the support ring 15 are fastened together by the stud and a nut to form an overall structure of a support device.

The sealing seat 4 is arranged at an end of the second connecting support frame 3, and a sealing groove is arranged on the sealing seat 4. The second sealing member 8 is disposed in the sealing groove of the sealing seat 4, so as to realize the sealing between the sealing seat 4 and the second connecting support frame 3.

The blind plate 1 is arranged on a rolling ring 14, the rolling ring 14 is arranged on the support ring 15, and the rolling ring 14 moves between the sealing seat 4 and the first connecting support frame 2 together with the blind plate 1 in the axial direction. The present application may do not have the rolling ring 14, and the blind plate is limited in the axial direction by providing a flanging structure at a position corresponding to the support ring 15. For the purpose of fast and labor-saving during operation, the rolling ring according to an embodiment of the present application includes an outer ring with an installation groove and a steel ball bushing. Steel balls are embedded inside the steel ball bushing and placed in the installation groove. In this way, the sliding friction in the operation process can be changed into the rolling friction. This solution is especially suitable for the switching of a large-diameter blind plate. The steel ball bushing serves as a cage of the steel ball, the material of the steel ball bushing can be aluminum alloy, or copper alloy, or polyacetal resin.

The handle 13 is used for pushing or pulling the blind plate 1.

A sealing groove is arranged on the blind plate 1, and the first sealing member 7 is arranged in the sealing groove of the blind plate 1.

The transmission nut 5 is connected to the second connecting support frame 3 through a transmission thread of the transmission nut 5, the transmission nut 5 has an internal thread, and correspondingly, the second connecting support frame 3 has an external thread. The internal thread and the external thread are a trapezoidal thread pair with self-locking characteristics.

The rotation of the internal thread of the transmission nut 5 drives the sealing seat 4 to move in the axial direction, and an axial movement generated during the rotation of the transmission nut 5 pushes the sealing seat 4 to move in the axial direction, and the blind plate 1 is pushed through the axial movement of the sealing seat 4.

The sealing at the blind plate 1 is realized by clamping the first sealing member 7 through the sealing seat 4 and the first connecting support frame 2.

The transmission shaft 6 is fixed to the hand wheel 9 by a locking nut, the transmission ring 12 is fixed to the transmission shaft 6 by an elastic cylindrical pin, the sealing seat 4 and the transmission nut 5 are axially linked (not indicated in the figure) by the fixing plate, and the transmission shaft 6 is connected to the transmission support block 16 by the transmission thread of the transmission shaft 6. The fixing plate may be a structure with a bending portion. The axial linkage of the transmission nut and the sealing seat can be realized by matching the bending portion with an annular groove arranged on the sealing seat. Certainly, the fixing plate may be other structural forms on the basis of the example of the present application, as long as the axial linkage between the transmission nut and the sealing seat can be realized.

The indicator plate 10 is used for indicating a working state of the hand wheel 9, including an "on" scale and an "off" scale.

Under the action of the external force, the hand wheel 9 rotates anticlockwise to drive the transmission shaft 6 and the transmission ring 12 to rotate and move in the axial direction. The transmission ring 12 pushes the transmission nut 5 to rotate and move in the axial direction, the transmission nut 5 pushes the sealing seat 4 to move in the axial direction, and then pushes the blind plate 1. The transmission ring 12 pushes the transmission nut 5 to rotate and move in the axial direction, which is realized by the drive plate 17 vertically welded on an outer end face of the transmission nut.

The driving mode for operating the hand wheel 9 and the handle 13 includes one of the following modes: a manual mode, a pneumatic mode, a hydraulic mode and an electric mode.

The first sealing member 7 and the second sealing member 8 are one of the following forms: a sealing gasket, a sealing ring, a wound gasket, a sealing block and a metal gasket.

One half of the blind plate 1 is an opening, and the other half of the blind plate 1 is a solid plate. The opening is used for communicating the pipeline, and the solid plate is used for isolating the pipeline.

When the stop plate 11 on a side of the blind plate 1 abuts against the first connecting support frame 2, the status of the blind plate 1 controlled by the handle 13 is one of the followings: an opening end is in the work and a blind end is in the work.

The transmission process of the force in the process of pressing the sealing is as follows: the external force acts on the hand wheel 9 anticlockwise, the hand wheel 9 rotates anticlockwise to drive the transmission shaft 6 to rotate and move in the axial direction, drives the transmission ring 12 to rotate and move in the axial direction, the transmission ring 12 pushes the drive plate 17, then pushes the transmission nut 5 to rotate and move in the axial direction, the transmission nut 5 pushes the sealing seat 4 to move in the axial direction, and then pushes the blind plate 1; finally, the sealing is realized by clamping the first sealing member 7 at the blind plate 1 through the sealing seat 4 and the first connecting support frame 2.

The transmission process of the force in the process of loosening the sealing is as follows: the external force acts on the hand wheel 9 clockwise, the hand wheel 9 rotates clockwise to drive the transmission shaft 6 and the transmission ring 12 to rotate and move in the axial direction, the transmission ring 12 pushes the drive plate 17, and then pushes the transmission nut 5 to rotate and move in the axial direction away from a blind plate side, the transmission nut 5 pulls the sealing seat 4 to move in the axial direction and then away from the blind plate 1.

The hand wheel 9 is rotated clockwise to the "on" scale of the indicator board 10, and the sealing pair is released through the transmission mechanism; the blind plate 1 is pushed to the stop plate 11 to be in contact with the first connecting support frame 2, and the position transformation of an opening side and a blind hole side of the blind plate 1 is completed; the hand wheel 9 is rotated anticlockwise to the "off" scale of the indicator board 10, and the sealing pair is press tightly through the transmission mechanism.

The transmission process of the force in the process of pressing the sealing is as follows: the external force acts on the hand wheel 9 anticlockwise, the hand wheel 9 rotates anticlockwise to drive the transmission shaft 6 to rotate and move in the axial direction, drives the transmission ring 12 to rotate and move in the axial direction, the transmission ring 12 pushes the drive plate 17, then pushes the transmission nut 5 to rotate and move in the axial direction, the transmission nut 5 pushes the sealing seat 4 to move in the axial direction, and then pushes the blind plate 1; finally, the sealing is realized by clamping the first sealing member 7 at the blind plate 1 though the sealing seat 4 and the first connecting support frame 2.

In order to improve the reliability of the whole device, a locking handle is installed on the transmission support block, and the transmission shaft moving in place is locked by the locking handle.

The invention claimed is:

1. A fast blind plate switching device, comprising:
   a sealing structure,
   a clamping structure,
   a support structure, and
   an actuator;
   wherein the blind plate has an open-state and a blind-state; the support structure is configured to connect pipelines at two sides and provide support for a whole device, the clamping structure and the sealing structure are located inside the support structure; the clamping structure is driven by the actuator, under a drive of the actuator, the clamping structure presses the blind plate to eliminate gaps between the clamping structure and the blind plate and the support structure and the blind plate at two sides of the blind plate, which allows a sealing to be formed by means of the sealing structure; when the gap is formed since the clamping structure is away from the blind plate, the open-state state and the blind-state of the blind plate are switched, wherein the support structure comprises a first connecting support frame, a second connecting support frame and a support ring; both the first connecting support frame and the second connecting support frame are of a rigid structure with a central through hole, the first connecting support frame and the second connecting support frame are connected and fixed by the support ring in an axial direction, the blind plate is placed between the first connecting support frame and second connecting support frame and is limited by the support ring; the second connecting support frame is provided with an installation end face of the clamping structure and the sealing structure, a distance between the installation end face and an axis of the central through hole is less than the minimum distance between an outer end face of the support ring and the axis of the central through hole.

2. The fast blind plate switching device according to claim 1, further comprising a rolling ring which is mounted outside the support ring, and the blind plate is limited by the rolling ring.

3. The fast blind plate switching device according to claim 2, wherein, the rolling ring comprises an outer ring with an installation groove and a steel ball bushing; a plurality of steel balls is embedded inside the steel ball bushing and placed in the installation groove.

4. The fast blind plate switching device according to claim 3, wherein, the material of the steel ball bushing is aluminum alloy, copper alloy, or polyacetal resin.

5. The fast blind plate switching device according to claim 1, wherein, the clamping structure is formed by cooperation between a transmission nut with an internal thread and the installation end face of the second connecting support frame, the installation end face is provided with an external thread matching the internal thread; a drive plate is arranged on an outer end face of the transmission nut, a driving force of the actuator is transmitted by the drive plate.

6. The fast blind plate switching device according to claim 5, wherein, the drive plate is vertically welded on the outer end face of the transmission nut.

7. The fast blind plate switching device according to claim 5, wherein, the internal thread and the external thread forms a trapezoidal thread pair with self-locking characteristics.

8. The fast blind plate switching device according to claim 5, wherein, the outer end face of the transmission nut is fixedly installed with a fixing plate with a bending portion, and an axial linkage between the transmission nut and the sealing seat is realized by the cooperation of the bending portion with the ring groove arranged on the sealing seat.

9. The fast blind plate switching device according to claim 1, wherein, the sealing structure comprises a sealing seat and a sealing member;

the sealing seat is an annular sealing seat, which is mounted on the installation end face of the second connecting support frame, and placed between the clamping structure and the blind plate; a sealing member is located between the sealing seat and the installation end face, the sealing seat and the blind plate, and the blind plate and the first connecting support frame, respectively, for sealing.

10. The fast blind plate switching device according to claim 9, wherein, the sealing member is one of the following forms: a sealing gasket, a sealing ring, a wound gasket, a sealing block and a metal gasket.

11. The fast blind plate switching device according to claim 1, wherein, the actuator comprises a hand wheel, a transmission shaft, a transmission support block and a transmission ring; the hand wheel is connected to the transmission shaft, the transmission shaft is mounted on the transmission support block and is connected to the transmission support block by a thread, the transmission ring is fixed on the transmission shaft, and a driving force is transmitted by a contact between the transmission ring and the clamping structure.

12. The fast blind plate switching device according to claim 11, further comprising a locking handle, wherein the transmission shaft moving in place is locked by the locking handle.

13. The fast blind plate switching device according to claim 11, wherein, the transmission ring is fixed to the transmission shaft through an elastic cylindrical pin, and the hand wheel is fixed to the transmission shaft by a locking nut.

14. The fast blind plate switching device according to claim 11, wherein, an indicator board is installed on the transmission support block, and an "on" scale and an "off" scale are preset on the indicator board to indicate a working state of the hand wheel.

15. The fast blind plate switching device according to claim 1, wherein, the blind plate has an open-state and a blind-state, and a part of a plate is provided with an opening, and another part is a solid plate, the opening is configured to communicate the pipelines and the solid plate is configured to isolate the pipelines.

16. The fast blind plate switching device according to claim 15, wherein, a stop plate is mounted at each of two ends of the blind plate in a switching direction, at least the stop plate at one end of the blind plate is equipped with a handle, which is configured to push the blind plate to a place where the stop plate is in contact with the support structure and complete a switching of the open-state and the blind-state of the blind plate.

17. The fast blind plate switching device according to claim 11, wherein, a driving mode for operating the hand wheel or the handle comprises one of following modes: a manual mode, a pneumatic mode, a hydraulic mode and an electric mode.

18. The fast blind plate switching device according to claim 12, wherein, the transmission shaft is fixed to the transmission ring through an elastic cylindrical pin, and the hand wheel is fixed to the transmission shaft by a locking nut.

19. The fast blind plate switching device according to claim 16, wherein, a driving mode for operating the hand wheel or the handle comprises one of following modes: a manual mode, a pneumatic mode, a hydraulic mode and an electric mode.

* * * * *